(12) United States Patent
Marchese et al.

(10) Patent No.: US 11,852,772 B2
(45) Date of Patent: *Dec. 26, 2023

(54) MAIL SCREENING APPARATUS

(71) Applicant: RAYSECUR, INC., Québec (CA)

(72) Inventors: Linda Marchese, Québec (CA); Alain Bergeron, Québec (CA); Eric Giroux, Québec (CA); Marc Terroux, Québec (CA)

(73) Assignee: RAYSECUR INC., Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,538

(22) Filed: Mar. 11, 2022

(65) Prior Publication Data
US 2022/0196869 A1    Jun. 23, 2022

Related U.S. Application Data

(63) Continuation of application No. 16/292,035, filed on Mar. 4, 2019, now Pat. No. 11,300,699, which is a continuation of application No. 15/388,956, filed on Dec. 22, 2016, now Pat. No. 10,247,842.

(60) Provisional application No. 62/387,592, filed on Dec. 23, 2015.

(51) Int. Cl.
*G01V 3/08* (2006.01)
*G01V 11/00* (2006.01)
*H04N 23/57* (2023.01)
*H04N 23/80* (2023.01)
*G01J 1/02* (2006.01)
*G01J 1/04* (2006.01)
*H04N 23/56* (2023.01)

(52) U.S. Cl.
CPC .............. *G01V 3/08* (2013.01); *G01J 1/0271* (2013.01); *G01J 1/0411* (2013.01); *G01J 1/0422* (2013.01); *G01V 11/00* (2013.01); *H04N 23/57* (2023.01); *H04N 23/80* (2023.01); *H04N 23/56* (2023.01)

(58) Field of Classification Search
None
See application file for complete search history.

(56) References Cited

U.S. PATENT DOCUMENTS

| | | |
|---|---|---|
| 4,454,605 A | 6/1984 | De Lucia |
| 11,300,699 B2 | 4/2022 | Marchese et al. |

(Continued)

*Primary Examiner* — Kaitlin A Retallick
(74) *Attorney, Agent, or Firm* — NIELDS, LEMACK & FRAME, LLC.

(57) ABSTRACT

A mail screening apparatus is provided to perform the inspection of mail or similar objects. Terahertz inspection is used to localize potential suspicious areas by imaging the contents inside the envelope or small parcel. The mail screening apparatus includes a primary and a secondary inspection zone, preferably allowing inspection of the mail in a normal and a zoomed mode, respectively. The same light source, image capture device and intervening optical components are used in both normal and zoomed modes. Metal detection may optionally be used to enhance awareness in the presence of metallic content. In one implementation, metal detection zones are provided in an orthogonal configuration with respect to the primary inspection zone used for terahertz imaging to accommodate for both manual and automatic inspection of mail.

19 Claims, 5 Drawing Sheets

(56) References Cited

U.S. PATENT DOCUMENTS

| | | | |
|---|---|---|---|
| 2002/0046995 A1* | 4/2002 | Chang | B81C 1/00071 |
| | | | 219/121.69 |
| 2004/0000999 A1 | 1/2004 | Turner et al. | |
| 2004/0065831 A1 | 4/2004 | Federici et al. | |
| 2006/0056586 A1 | 3/2006 | Uetake et al. | |
| 2008/0231808 A1* | 9/2008 | Van de Velde | A61B 3/1025 |
| | | | 351/221 |
| 2013/0170611 A1 | 7/2013 | Beckmann et al. | |
| 2013/0229511 A1 | 9/2013 | Oostendorp et al. | |
| 2014/0125969 A1* | 5/2014 | Jordan | G01N 21/59 |
| | | | 356/432 |
| 2015/0164327 A1 | 6/2015 | Yaroslavsky et al. | |
| 2015/0241341 A1* | 8/2015 | Ikeda | G01N 21/84 |
| | | | 378/57 |
| 2016/0131889 A1* | 5/2016 | Morimoto | G01J 3/0208 |
| | | | 250/492.1 |
| 2017/0012199 A1* | 1/2017 | Sabry | G01J 3/0208 |
| 2019/0196044 A1 | 6/2019 | Marchese et al. | |

* cited by examiner

MAIL SCREENING APPARATUS

CROSS-REFERENCE TO RELATED APPLICATIONS

This application is a continuation of U.S. application Ser. No. 16/292,035 filed Mar. 4, 2019, which is a continuation of U.S. application Ser. No. 15/388,956 filed Dec. 22, 2016 (now U.S. Pat. No. 10,247,842 issued Apr. 2, 2019), which claims the benefit of priority of U.S. provisional Application No. 62/387,592 filed Dec. 23, 2015, the disclosures of which are incorporated herein by reference in their entireties.

TECHNICAL FIELD

The technical field generally relates to live screening of mail.

BACKGROUND

Live mail screening is a technique which allows seeing through envelopes and small parcels, enabling the detection of suspicious items such as powders or electrical circuits prior to opening the mail and exposing these contents. It is known in the art of mail screening to use radiation in the long terahertz (THz) wavelengths, for example between 700 μm and 1075 μm, as the penetration depth of the THz radiation is long enough to see through envelopes and small parcels.

There remains a need in the field for a practical and efficient apparatus for screening mail or similar small objects.

SUMMARY

In accordance with one aspect, there is provided a mail screening apparatus to perform the inspection of mail or similar objects. Terahertz inspection is used to localize potential suspicious areas by imaging the contents inside the envelope or small parcel. The mail screening apparatus includes a primary and a secondary inspection zone, preferably allowing inspection of the mail in a normal and a zoomed mode, respectively. The same light source, image capture device and intervening optical components are used in both normal and zoomed modes.

Metal detection may optionally be used to enhance awareness in the presence of metallic content. In one implementation, metal detection zones are provided in an orthogonal configuration with respect to the primary inspection zone used for terahertz imaging to accommodate for both manual and automatic inspection of mail.

In one embodiment there is provided a mail screening apparatus including a casing having a base and a top housing mounted over the base in a spaced-apart relationship. The base and the top housing define a mail inspection bay therebetween having a primary inspection zone and a secondary inspection zone. The base includes an inspection counter for supporting a piece of mail to be screened at either one of the primary and secondary inspection zones. The inspection counter allows light therethrough at the primary and secondary inspection zones.

The mail screening apparatus further includes a light generating assembly mounted in the top housing and configured to generate an inspection light beam having an optical frequency in the terahertz frequency range. The light generating assembly is further configured to project the inspection light beam into the base through the primary inspection zone.

The mail screening apparatus further includes a light redirection assembly provided in the base and configured to redirect the inspection light beam entering the base from the primary inspection zone to emerge through the secondary inspection zone and project towards the top housing.

A light collecting assembly is mounted in the top housing and configured to receive and detect the inspection light beam projected from the base through the secondary inspection zone. Finally, the mail screening apparatus includes a focus adjusting mechanism operable to adjust a focus of the light collecting assembly on either one of the primary or the secondary inspection zones.

In some implementations, the optical frequency of the inspection light beam corresponds to a wavelength between 700 μm and 1075 μm.

In some implementations, the light generating assembly includes a light source generating the inspection light beam and a beam conditioning assembly configured to transform the spatial energy distribution of the inspection light beam from a Gaussian initial shape with an elliptical footprint to a flat-top final shape with a rectangular footprint.

Optionally, the top housing may include an output window made of a transparent material positioned across a path of the inspection light beam towards the primary inspection zone, and an output window made of a transparent material positioned across a path of the inspection light beam into the top housing through the secondary inspection zone. The inspection counter may have a primary inspection window made of a transparent material and extending along the primary inspection zone. Preferably, the primary inspection window has a lens curvature. The inspection counter may further have a secondary inspection window made of a transparent material and extending along the secondary inspection zone.

In some implementations, the light redirection assembly may include a pair of folding mirrors mounted at opposite 45° angles with respect to a plane of the inspection counter.

In some implementations, the light collecting assembly includes a camera objective having a focus controllable by the focus adjusting mechanism. The focus adjusting mechanism may for example be embodied by a rotating handle operatively connected to the camera objective.

In some implementations, the light collecting assembly may further include an image capture device positioned to receive and detect the inspection light beam collected by the camera objective. The image capture device may for example be embodied by a 2D image sensor.

In some implementations, the mail screening apparatus may further include an electronic board configured to perform control functions including acquiring image data from the image capture device and preprocessing and formatting said image data. A processing unit may be connected to the electronic board and configured to perform a postprocessing of the image data. In some embodiments, a display may be integrated in a front portion of the top housing and operatively connected to the processing unit to receive the post-processed image data therefrom.

In some implementations, the mail inspection bay may further include at least one metal detection zone. For example, the mail inspection bay may include a first and a second metal detection zone orthogonally disposed with respect to the primary inspection zone, the secondary inspection zone extending on a side of the primary inspection zone opposite the first metal detection zone.

DETAILED DESCRIPTION

Referring to FIGS. 1 to 5, there is shown a mail screening apparatus 20 according to one embodiment. In the illustrated embodiment the mail screening apparatus 20 advantageously combines metal detection and THz imaging to perform the inspection of the mail. The THz inspection aspect is used to obtain an image of the contents inside the envelope or small parcel, to localize potential suspicious areas. The metal detection zone is used to enhance awareness in the presence of metallic content.

It will be readily understood that variants of a mail screening apparatus such as described herein may be used for the screening of mail of various types such as envelopes, small parcels and the like.

Figure 1A:
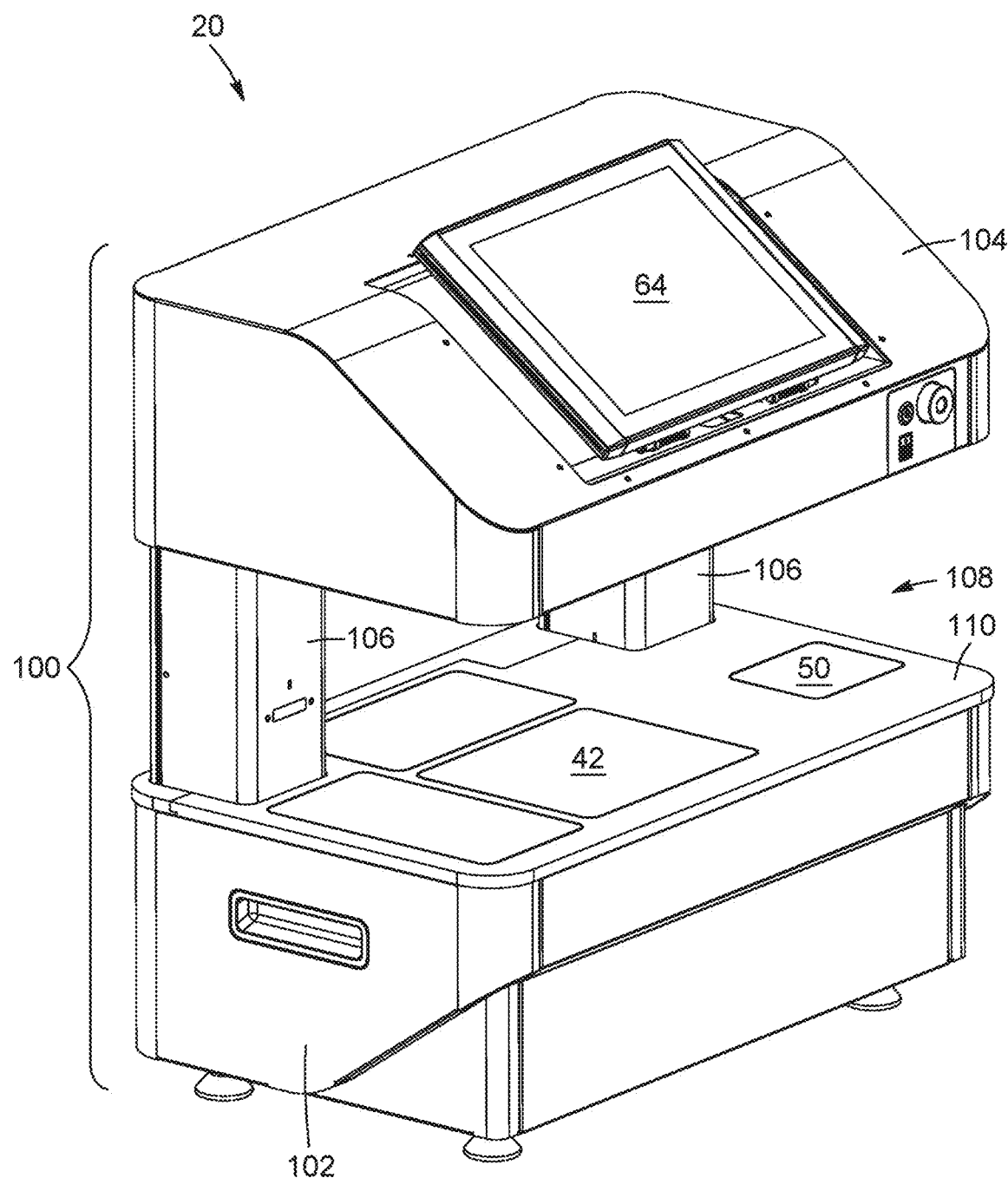
FIGS. 1A and 1B are front and rear isometric views of a mail screening apparatus according to an embodiment.
Figure 1B:
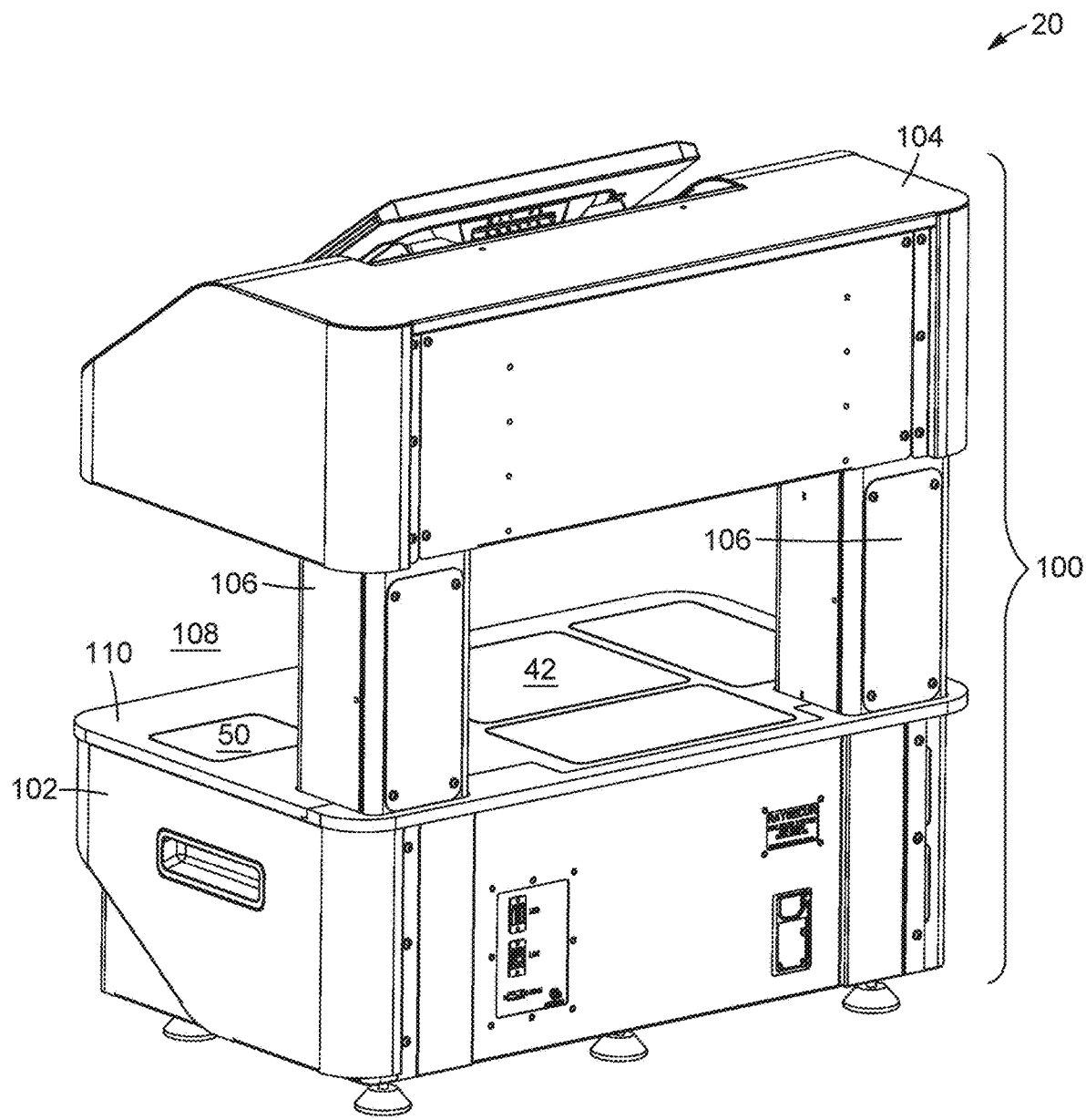

Referring more particularly to FIGS. 1A and 1B, in some implementations, the mail screening apparatus 20 is a stand-alone device incorporating all of the components described below in a single casing 100. Preferably, the casing 100 includes a base 102 and a top housing 104 mounted over the base 102 in a spaced-apart relationship, for example using frame members such as a pair of frame posts 106. The free space between the base 102 and the top housing 104 defines a mail inspection bay 108. The mail inspection bay 108 is preferably large enough to allow the inspected mail to be handled within the bay. The top wall of the base 102 defines an inspection counter 110 on which mail to be inspected can be placed. The inspection counter 110 is separated into different inspection zones, including a primary inspection zone 42 and a secondary inspection zone 50. The inspection counter 110 can support a piece of mail to be screened at either one of the primary and secondary inspection zones 42 and 50. As explained further below, the inspection counter 110 allows light therethrough at the primary and secondary inspection zones 42 and 50. An opening in the back central section of the base 102, here defined by the free space between the frame posts 106, allows for an optional conveyor belt (not shown).

Figure 2:
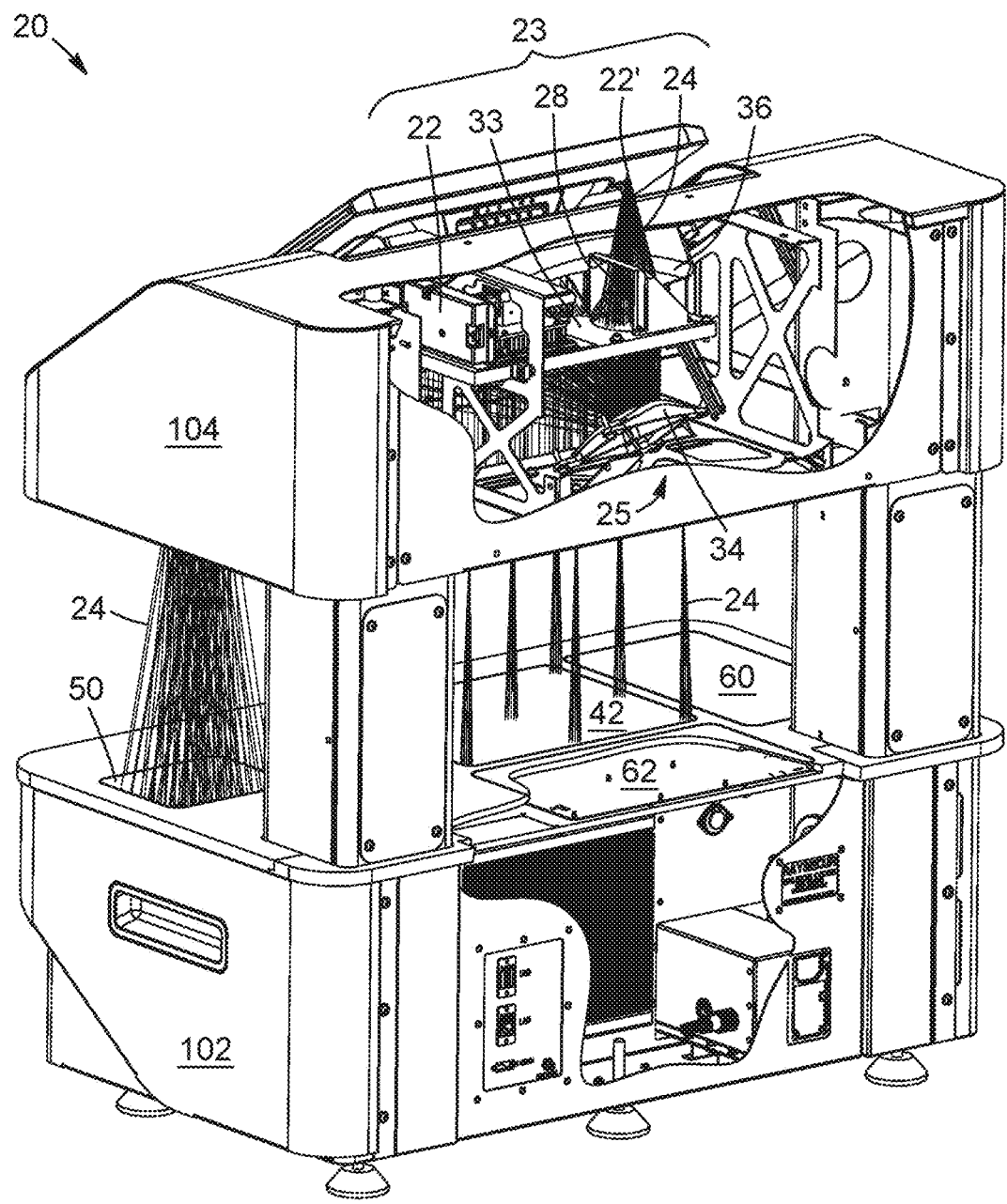
FIG. 2 is a rear isometric view in partial transparency of the mail screening apparatus of FIGS. 1A and 1B.
Figure 3:
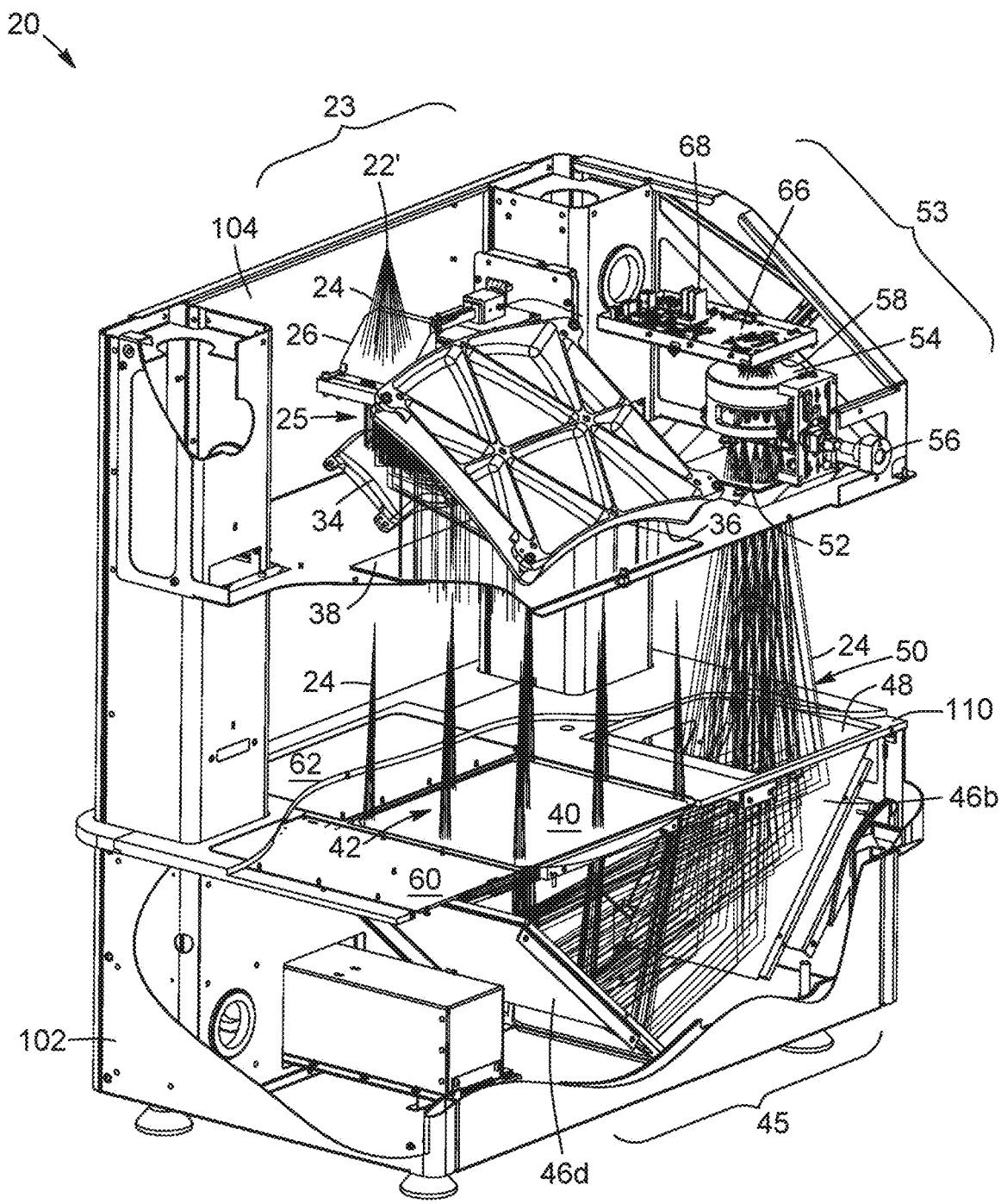
FIG. 3 is a front isometric view in partial transparency of the mail screening apparatus of FIGS. 1A and 1B.

Referring to FIGS. 2 and 3, the mail screening apparatus 20 includes a light generating assembly 23 mounted in the top housing 104 and configured to generate an inspection light beam 24 and project the inspection light beam 24 into the base 102 through the primary inspection zone 42. in the illustrated embodiment the light generating assembly 23 first includes a light source 22 mounted within the top housing 104 and emitting the inspection light beam 24 (referred to hereinbelow as the "light beam" for simplicity). In some implementations, the light source 22 emits light at an optical frequency in the terahertz range, for example at a frequency corresponding to a wavelength between 700 μm and 1075 μm. In some implementations the optical frequency of the inspection light beam may correspond to a wavelength between 50 μm and 3 mm. It will be readily understood by one skilled in the art that the term "light source" is meant to encompass stand-alone devices as well as more complex optical assemblies or systems comprising a plurality of components cooperating together to provide the desired light beam. An example of commercially available light sources that may be used in some implementations includes a Gunn oscillator from Sage Millimeter Inc. combined with frequency doublers and triplers from Virginia Diodes Inc. emitting above 2 mW at a wavelength of 1.06 mm, with an antenna also from Virginia Diodes. In other embodiments, the light source may for example be a Schottky diode or a GaAs diode emitting radiation at a suitable wavelength.

The light generating assembly 23 may next include any number of optical components in a path of the light beam 24 for shaping, collimating and redirecting the light beam 24. In the present example the light generating assembly 23 includes a beam conditioning assembly 25 within the top housing 104 which shapes and expands the transverse irradiance profile of the optical beam 24 radiated by the light source 22. In one implementation the light beam 24 has a footprint between 125 mm and 400 mm. In some implementations, the beam conditioning assembly 25 may favor a uniform irradiance distribution along the transverse plane of the light beam 24. Examples of beam conditioning devices suitable for this purpose are disclosed in the U.S. patent application entitled "BEAM CONDITIONING DEVICE" filed concurrently with the present application and naming Michel Doucet, Alain Bergeron and Linda Marchese as inventors, the contents of which being incorporated herein by reference in its entirety.

In the illustrated embodiment of FIG. 2, the beam conditioning assembly 25 includes a convex mirror 34 and a concave mirror 36 successively disposed in a path of the light beam 24. The shapes of the convex and concave mirrors 34 and 36 are preferably computed to transform the transverse spatial energy distribution of the light beam from a Gaussian initial shape with an elliptical footprint, as typically characterizing light beams emitted from the type of light source used herein, to a flat-top final shape with a rectangular footprint. The local curvature of the convex mirror 34 is designed to control the intensity distribution of the light beam. The concave mirror 36 reflects the divergent light beam 24 from the convex mirror 34 so that, as a result, the light beam 24 reflected off the concave mirror 36 is collimated and has a propagation axis parallel to its propagation axis prior to reflection on the convex mirror 34.

The beam conditioning assembly 25 may further include a first mirror 26 positioned at an angle of 45° with respect to the propagation axis of the light beam 24 impinging thereon from the light source 22 upstream the convex and concave mirrors 34 and 36. It will be noted that for clarity, the portion of the light beam 24 extending between the light source 22 and the first mirror 26 is not shown, replaced instead by the virtual image 22' of the source on the side of the first mirror 26 opposite its reflecting surface 28. In some implementations (not illustrated), the first mirror 26 may be a coherence-breaking mirror having a reflective surface provided with a structured pattern (not shown). The structured pattern may for example be composed of a plurality of sloped elements distributed over the reflecting surface, each sloped element deviating the beam component of the light beam incident thereon at a slightly different angle than the deviation imparted on neighboring beam components by neighboring sloped elements. Reflection of the light beam by the sloped element therefore breaks the spatial coherence of the light beam. The slope of each sloped element may be computed to deviate the beam component of the light beam incident thereon by an angle smaller than the divergence of the light beam. In further variants, the coherence-breaking mirror may be mounted on a rotating mount (not shown), preferably operated by a motor. In this variant, the coherence-breaking mirror is therefore rotatable about a rotation axis normal to its reflecting surface, thus breaking the temporal coherence of the light beam reflected thereon.

In the illustrated embodiment of FIG. 2, a collimating lens 33 is disposed on the optical path downstream the reflection on the first mirror 26. The collimating lens 33 may for example be embodied by a spherical or aspherical lens, and transforms the light beam 24 into a slowly-diverging beam. It will be readily understood that other configurations can be considered and that additional optical elements may be provided in the path of the light beam as part of the beam conditioning assembly without departing from the scope of the invention.

As best seen in FIG. 3, the light beam 24 exits the top housing 104 through an output window 38 provided underneath the top housing 104. The output window 38 is preferably made of polyethylene, glass, or other suitably transparent material. The output window 38 can advantageously protect the optical components within the top housing 104 from dust or other contaminants. In some embodiments, the output window may be omitted.

The light beam 24 travels downward from the output window 38 towards the base 102 of the casing 100, where it reaches a primary inspection window 40 provided in the inspection counter 110 and vertically aligned with the output window 38. The space immediately above the primary inspection window 40 within the path of the light beam 24 defines the primary inspection zone 42 for the mail to be inspected. The portion of the light beam 24 transmitted through the mail to be inspected and the primary inspection window 40 therefore contains imaging information on the contents of the mail, which can be processed as explained further below. In some implementations, the primary inspection zone 42 has a large imaging area. One example of an imaging area suitable for mail inspection can be around 9.5 inch by 7.125 inch. The primary inspection window 40 may also be made of polyethylene, glass, or other suitably transparent material. Preferably, the primary inspection window 40 has a curvature (best seen in FIGS. 4 and 5) designed to act as a field lens in order to collect more energy from the light beam 24 transmitted through the mail provided within the primary inspection space 42. As will be explained in further details below, the primary inspection window 40 is preferably located at an imaging plane so that when an object for inspection is placed in the primary inspection zone 42 its image will be in focus on the image sensor.

Figure 5:
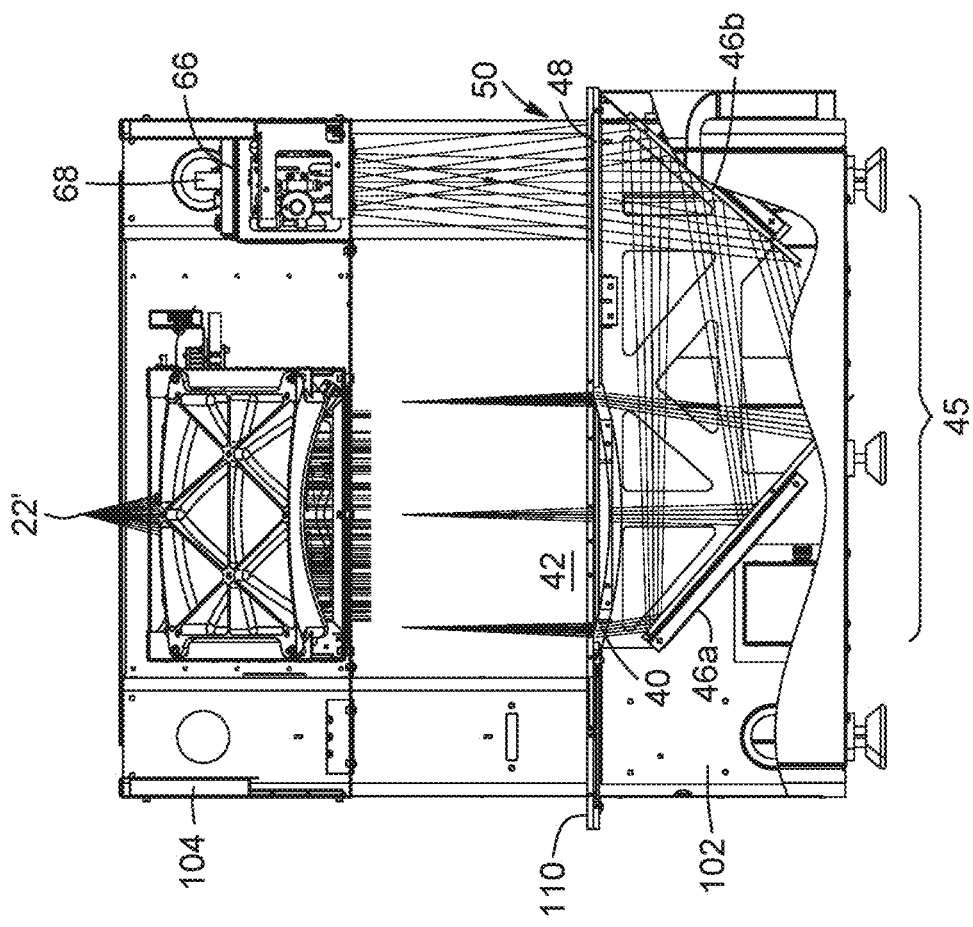
FIG. 5 is a front view in partial transparency of the mail screening apparatus of FIGS. 1A and 1B.
Figure 4:
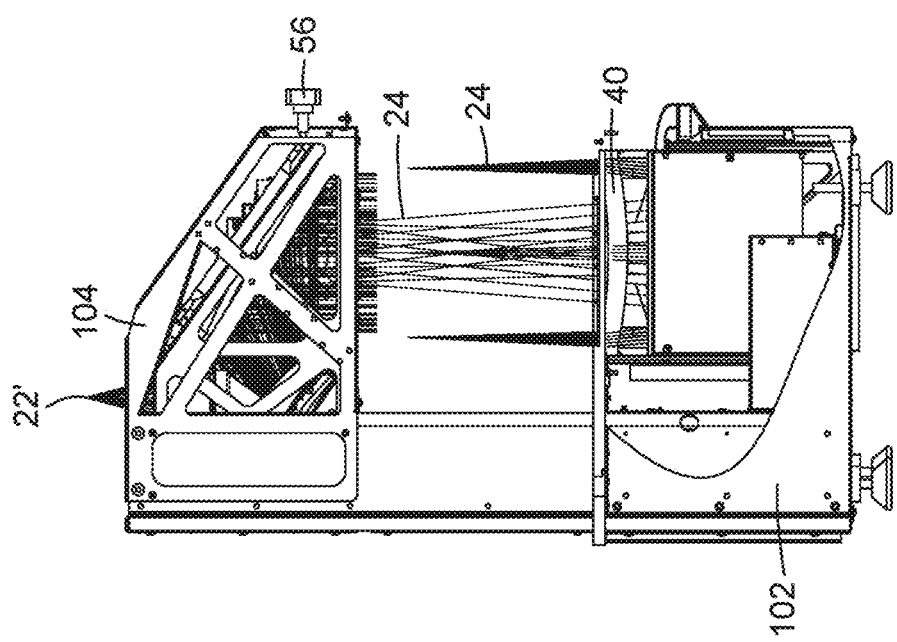
FIG. 4 is a side view in partial transparency of the mail screening apparatus of FIGS. 1A and 1B.

The mail screening apparatus 20 further includes a light redirection assembly 45 provided in the base 102 and configured to redirect the inspection light beam 24 entering the base 102 from the primary inspection zone 42 to emerge through the secondary inspection zone 50 and project towards the top housing 104. Referring to FIGS. 3 and 5, in the illustrated embodiment the light redirecting assembly 45 includes a pair of folding mirrors 46a and 46b, mounted at opposite 45° angles with respect to the plane of the inspection counter 110. The folding mirrors 46a and 46b are preferably planar mirrors. Reflection on both folding mirrors 46a and 46b redirects the light beam 24 upwards at a location offset the primary inspection zone 42, where it exits the base 102 through a secondary inspection window 48 mounted in the inspection counter 110. The secondary inspection window 48 may also be made of polyethylene, glass, or other suitably transparent material. The space above the secondary inspection window 48 within the path of the light beam 24 defines the secondary inspection zone 50, spanning a narrower imaging area than the primary inspection zone 42. The mail to be inspected can therefore be placed in the secondary inspection zone 50 to provide a zoomed image of a portion of the mail.

Referring again more particularly to FIG. 3, after crossing the secondary inspection zone 50, the light beam re-enters the top housing 104, which is preferably provided with an input window 52. The input window 52 may also be made of polyethylene, glass, or other suitably transparent material. In other variants the input window may be replaced by a suitably sized pass-through opening.

The mail screening apparatus 20 further includes a light collecting assembly 53 mounted in the top housing 104 and configured to receive and detect the inspection light beam 24 projected from the base 102 through the secondary inspection zone 50. Still referring particularly to FIG. 3, in the illustrated example the light beam 24 is collected by a camera objective 54. In one implementation, the camera objective 54 includes a fast objective lens having an f-number (f/#) preferably lower than f/1.2. A focus adjusting mechanism is provided to adjust the focus of the light collecting assembly 53 on either the primary or the secondary inspection window 40 or 48, depending on the inspection zone being used. In the illustrated variant the focus adjusting mechanism is embodied by a rotating handle 56 operatively connected to the camera objective 54, but it will be readily understood that other means for setting the focus, mechanically or electrically, can be used without departing from the scope of the invention.

Still referring to FIG. 3, the light collecting assembly 53 further includes an image capture device 58 positioned to receive and detect the light collected by the camera objective 54. The image capture device 58 preferably comprises a 2D image sensor preferably sensitive in a suitable portion of the wavelength region spanning from 700 μm to 1075 μm and preferably with a resolution of at least 320×240 pixels. An example of a suitable image sensor is the one used in the IRXCAM-384THz camera module available from INO (Quebec, Canada), sensitive to the THz waveband.

Referring now to FIGS. 2 and 3, the mail screening apparatus 20 may further include at least one metal detection zone. In the illustrated embodiment first and second metal detection zones 60 and 62 are set along the inspection counter 110 and orthogonally disposed with respect to the primary inspection zone 42. In the illustrated embodiment, the first metal detection zone 60 extends on the left side of the primary inspection zone 42, opposite to the secondary inspection zone 44, and the second metal detection zone 62 extends at the rear of the primary inspection zone 42. In one implementation, each metal detection zone is composed of a mosaic of smaller metal detectors, each overlapping to ensure complete inspection of the mail. Examples of suitable metal detectors can for example be custom printed circuit boards of coils or inductances. Analysis of the electric signal from the metal detectors may be performed on the electronic board 66 provided with an analysis integrated circuit, such as for example a Texas Instrument LDC1614. Data analysis from the metal detectors may for example be performed according to an operation similar to that used by the Scanmail 10K system from Scanna (http://www.scanna-msc-.com/uk/shop/letterbomb-detector-mailscanner-scanmail-10k/).

As best seen in FIG. 1A, a display 64 is preferably provided to allow a user to visualize the inspection results of a piece of mail positioned in either one of the inspection zones 42, 50 or metal detection zones 60, 62. The display 64 is preferably integrated in a front portion of the top housing 104 for easy viewing by a user positioned in front of the mail screening apparatus 20. The display may be embodied by a LCD screen, a touchscreen, etc. The display 64 may be mounted on the top housing 104 so as to be pivotable along at least one axis, to adapt to the position of the user in front of the mail screening apparatus 20. In some implementations, the display 64 may be omitted from the mail screening apparatus and a connection to a separate visualizing device may be provided instead.

Referring again to FIGS. 3 and 5, the mail screening apparatus further includes an electronic board 66. The electronic board 66 is configured to perform a variety of control functions, such as, non-limitatively:

a. Acquiring the image data from the image capture device;
b. Preprocessing and formatting of the image data;
c. Acquiring the data from the metal detectors.

A processing unit 68 is preferably provided on the electronic board 66 and is provided with operating software configured to perform various processing functions, such as, non-limitatively:

a. Postprocessing of the image data acquired by the image capture device (e.g. edge enhancement);
b. Processing of the information from the metal detectors;
c. Generating an alarm when the response of the metal detector is above a given threshold;
d. Displaying of the acquired and processed images on the display;
e. Saving the images in memory;
f. Linking the system to an ethernet output for remote control.

It will be readily understood that the electronic board and processing unit may be embodied by a variety of devices, modules and combinations thereof without departing from the scope of the invention. In some embodiments, some or all of the processing functions may be performed by an external processor in communication with the mail screening apparatus.

The mail screening apparatus 20 may be provided with any suitable user interface components providing for an easy interaction with a user. In one example, the display 64 may be embodied by a touchscreen configured to provide the user with controls and options for using the mail screening apparatus 20. Alternatively or additionally, the mail screening apparatus 20 may be provided with keys, buttons, switches, pads, or any other user interface implements well known in the art.

Advantageously, the mail screening apparatus as described above can be operable in either a "Normal" or a "Zoomed" mode. In the Normal mode, a piece of mail to be inspected is positioned in the primary inspection zone 42, and the focus of the camera objective 54 is adjusted so that the image of the primary inspection window 40 is in focus on the image capture device 58. The secondary inspection zone is left free of any obstruction, so that the light beam 24 reaching the image capture device 58 provides images of the contents of the mail disposed in the primary inspection zone 42. Similarly, in the Zoomed mode a piece of mail to be inspected is positioned in the secondary inspection zone 44, the focus of the camera objective 54 is adjusted so that the image of the secondary inspection window 48 is in focus on the image capture device 58. In this case the primary inspection zone 42 is left free of any obstruction.

The piece of mail to be inspected can also be positioned on one of the metal detection zones 60 or 62 to detect the presence of metal parts enclosed within. In one embodiment, an alarm can be triggered when metal is indeed detected. The alarm can be a visual indication on the display, an audio alarm or any other means of communicating the information to a user.

Advantageously, the orthogonal configuration of the metal detection zones with respect to the THz imaging primary inspection zone can accommodate for both manual and automatic inspection of mail.

In one implementation, manual inspection of a piece of mail can be performed from left to right, with a user first placing the piece of mail on the first metal detection zone 60, receiving an indication of the presence of metal if it is indeed the case. The user then moves the piece of mail to the primary inspection zone 42, adjusting the focus of the camera objective if necessary. An image of the contents of the piece of mail is displayed on the display for the user to review. Optionally, for example if the overall image of the mail seems to indicate suspicious contents in a particular area of the piece of mail, the user can move the mail to the secondary inspection zone 44 with the area of interest aligned with the secondary inspection window 48, again adjusting the focus of the camera objective as necessary. A zoomed image of the area of interest is presented on the display.

Automatic inspection of mail using the mail inspection apparatus described above may for example be provided by mounting a conveyor belt (not shown) on the apparatus moving mail for inspection from rear to front (or front to rear) over the inspection counter 110, first passing a given piece of mail over the second metal detection zone 62 and then over the primary inspection zone 42. Mail for inspection can be fed to the conveyor belt manually or from a separate automated conveying device. In this mode, the secondary inspection zone 50 is left free of any obstruction. If suspicious contents are detected, the automatic feeding of mail for inspection can be interrupted and/or the piece of mail ejected. The primary inspection zone 42 can be cleared and the suspicious piece of mail can be inspected manually in the zoomed mode, as explained above.

Of course, numerous modifications could be made to the embodiments described above without departing from the scope of the invention.

The invention claimed is:

1. An object detection apparatus, comprising:
a casing with an inspection bay;
a coherent light generating assembly configured to generate a coherent light beam;
a coherence breaking optical element, wherein the coherence breaking optical element is a mirror, for changing the coherent light beam into a broken coherence light beam and projecting a broken coherence light beam into an object inspection zone, the object inspection zone defined by a path of the broken coherence light beam and the inspection bay;
a light collecting assembly positioned and configured to receive light resulting from the interaction of an object within the object inspection zone and the broken coherence light beam;
a sensor to receive light from the light collecting assembly and sensitive to the broken coherence light beam for producing image data representative of object contents; and an electronic board configured to process the image data.

2. The object detection apparatus according to claim 1, wherein the coherence breaking optical element is rotated about a rotation axis normal to its reflecting surface.

3. The object detection apparatus according to claim 1, wherein the mirror has a structured pattern.

4. The object detection apparatus according to claim 3, wherein the structured pattern comprises a plurality of sloped elements distributed over the reflecting surface, each sloped element deviating a beam component of the coherent light beam incident thereon at a slightly different angle than the deviation imparted on neighboring beam components by neighboring sloped elements.

5. The object detection apparatus according to claim 4, wherein a slope of each sloped element may be computed to deviate the beam component of the coherent light beam incident thereon by an angle smaller than the divergence of the coherent light beam.

6. The object detection apparatus according to claim 1, wherein the coherent light beam corresponds to an optical wavelength range between 50 μm and 3 mm.

7. The object detection apparatus according to claim 1, further comprising a beam conditioning assembly configured to transform the spatial energy distribution of the broken coherence light beam into a flat-top final shape with a rectangular footprint in the object inspection zone.

8. An object detection apparatus, comprising:
a casing with a light generating assembly and a light collecting assembly;
wherein the light generating assembly generates a coherent inspection light beam having a light beam path which passes through a first inspection zone and a second inspection zone to the light collecting assembly;
a coherence breaking optical element for interacting with the inspection light beam and projecting a broken coherence inspection light beam into the first inspection zone;
the light collecting assembly configured to receive light resulting from the interaction of objects within the first inspection zone and second inspection zone and the broken coherence inspection light beam, the light collecting assembly comprising a sensor sensitive to the broken coherence inspection light beam for producing image data representative of object contents; and
an electronic board configured to process the image data.

9. The object detection apparatus according to claim 8, further comprising a focus mechanism whereby a focus of the light collecting assembly is located in the first inspection zone and a second focus of the light collecting assembly is located in the second inspection zone, thereby enabling in focus imaging of an object in the first inspection zone and the second inspection zone.

10. The object detection apparatus according to claim 9, wherein the focus of the light collecting assembly in the second inspection zone is located at an inspection counter, thereby enabling in focus imaging of an object on the inspection counter.

11. The object detection apparatus according to claim 9, wherein the focus of the light collecting assembly in the first inspection zone is located at an inspection counter, thereby enabling in focus imaging of an object on the inspection counter.

12. The object detection apparatus according to claim 8, further comprising a lens between the first inspection zone and the second inspection zone.

13. The object detection apparatus according to claim 8, wherein the coherence breaking optical element is rotated about a rotation axis normal to its reflecting surface.

14. The object detection apparatus according to claim 8, wherein the coherence breaking optical element is a mirror.

15. The object detection apparatus according to claim 14, wherein the mirror is a reflective surface with a structured pattern.

16. The object detection apparatus according to claim 15, wherein the structured pattern comprises a plurality of sloped elements distributed over the reflecting surface, each sloped element deviating the beam component of the inspection light beam incident thereon at a slightly different angle than the deviation imparted on neighboring beam components by neighboring sloped elements.

17. The object detection apparatus according to claim 16, wherein the slope of each sloped element may be computed to deviate the beam component of the inspection light beam incident thereon by an angle smaller than the divergence of the inspection light beam.

18. The object detection apparatus of claim 8, further comprising a metal detector wherein an automatic inspection of objects is performed concurrently with the inspection of objects with the metal detector.

19. The object detection apparatus of claim 8, wherein the first inspection zone is used for the automatic inspection of objects and the second inspection zone is used for the inspection of objects when objects are not present in the first inspection zone.

* * * * *